United States Patent

[11] 3,587,327

| [72] | Inventor | Jean Pierre Desthuilliers<br>Chelles, France |
|---|---|---|
| [21] | Appl. No. | 768,310 |
| [22] | Filed | Oct. 17, 1968 |
| [45] | Patented | June 28, 1971 |
| [73] | Assignee | Compagnie Des Freins et Signaux Westing-<br>house, Freinville-Seman, France |
| [32] | Priority | Oct. 27, 1967 |
| [33] | | France |
| [31] | | 126252 |

[54] ANGULAR VELOCITY MEASURING AND DIRECTION INDICATING APPARATUS
4 Claims, 6 Drawing Figs.

[52] U.S. Cl. .................................................. 73/502, 73/521
[51] Int. Cl. .................................................. G01p 3/26
[50] Field of Search ........................................ 73/502, 505, 521—4; 137/27, 30, 36

[56] References Cited
UNITED STATES PATENTS

| 2,660,886 | 12/1953 | Milmore | 73/502 |
| 3,363,453 | 1/1968 | Erickson | 73/521 |
| 3,395,718 | 8/1968 | Wolff | 137/12 |

Primary Examiner—James J. Gill
Assistant Examiner—Herbert Goldstein
Attorneys—Adelbert A. Steinmiller and Ralph W. McIntire ABSTRACT: Angular velocity measuring and direction indicating apparatus in which a single fluid jet stream is divided into two jet streams each flowing in substantially tangential contact with opposite sides of a disc fixed on an axially rotating shaft which imparts to the jet streams a pressure differential having a magnitude proportional to the rotational velocity of the shaft, and imparts to one or the other of the jet streams the higher relative pressure depending upon the direction of shaft rotation. In one embodiment, a proportional amplifier device connected across the two jet streams operates a differential pressure gauge to provide indications of speed and direction. In another embodiment, a threshold pressure responsive device provides an output signal only when the output pressure of one of the jet streams exceeds a predetermined value.

INVENTOR
JEAN PIERRE DESTHUILLIERS

INVENTOR
JEAN PIERRE DESTHUILLIERS

BY Ralph W. McIntire
ATTORNEY

ANGULAR VELOCITY MEASURING AND DIRECTION INDICATING APPARATUS

BACKGROUND OF INVENTION

Heretofore, it has been proposed to measure angular velocity of a rotating body by integrating electrical, luminous, pneumatic or hydraulic pulses. In general, these devices are not capable of indicating the direction of rotation of the rotating body. Moreover, these electrical systems are incompatible with pneumatic or hydraulic control systems, and cannot be used in a gaseous environment susceptible to reaction to electrical spark.

SUMMARY OF INVENTION

It is the object of this invention to provide fluid controlled apparatus for measuring the angular velocity of a rotating body, and simultaneously indicating the direction of rotation of the rotating body.

In the present invention, this object is achieved by disposing a disc, known in the art as a Flettner rotor, in concentric fixed relation on a rotatable shaft, and extending the shaft through a housing with the disc disposed with radial clearance in a cavity within the housing. One end of the housing includes a single fluid passage which divides into two diverging passages so that each of the two passages in cooperation with the cavity walls pass fluid past diametrically opposite sides of the rotor. The opposite end of the housing includes a pair of spaced exit fluid passages each collecting fluid corresponding to one of the fluid passages. In one embodiment, a proportional amplifier is connected across the exit passages to amplify the pressure differential between the two exit passages, which pressure differential is controlled by the angular speed of the rotor, the outputs of the proportional amplifier being connected to a differential pressure gauge. The direction of rotation of the shaft is determined by the exit passage having the higher or lower pressure, depending upon choice. In another embodiment, a fluid pressure operated bistable device having a predetermined threshold value operates to provide a threshold pressure output signal only when the pressure at one of the two exit passages exceeds a predetermined value.

This and other objects will become more readily apparent in the following description, taken in conjunction with the drawings, in which.

Figure 1:
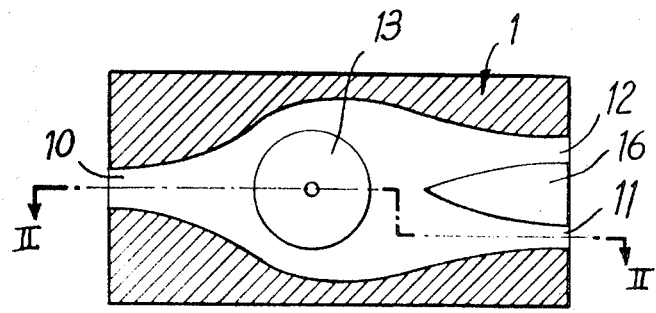
FIG. 1 is a cross-sectional view of a Flettner rotor device forming a part of my invention.
Figure 2:
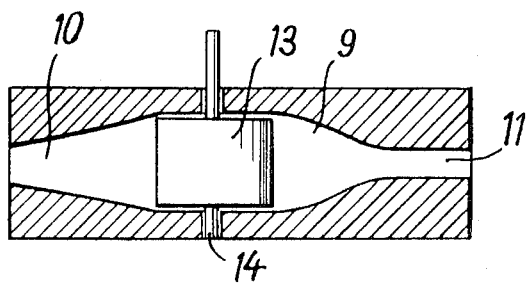
FIG. 2 is a cross-sectional view of the rotor taken substantially along the line II–II of FIG. 1.
Figure 3:
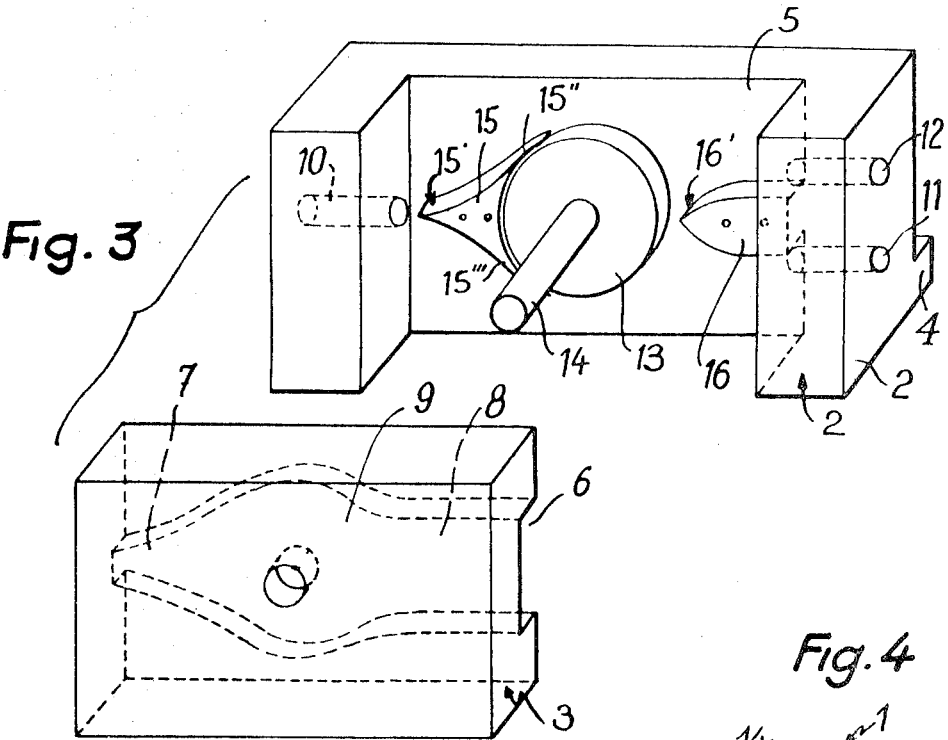
FIG. 3 is a partially exploded isometric view of structural details of the Flettner rotor of FIGS. 1 and 2.

Referring now to FIGS. 1, 2, 3 of the drawing, there is shown a Flettner rotor comprising housing 1 consisting of two sides, one side comprising a supporting side 2 and the other side comprising a closure side 3. Supporting side 2, preferably of rectangular shape, has an attachment foot 4 and a recess 5 shaped, for example, in the form of a parallelepiped, in which fits the closure side 3. The closure side 3 has on its face for contacting with the bottom of the parallelepipedal recess 5 a longitudinal recess 6, which may be of the same depth, and the shape of which is substantially that or a fluid stream enveloping a circular obstacle placed in its path, the end of the recess in the housing side ahead of the obstacle being smaller than the end of the cavity in the housing behind said obstacle, these ends being identified respectively as the inlet 7 and the outlet 8 of the fluid stream. The middle of the longitudinal recess 6 has an expanded portion 9. On joining sides 2 and 3, the longitudinal recess 6 forms with the bottom of parallelepipedal recess 5 a cavity, into which, from the inlet side 7, enters at least one supply conduit 10 and, from the outlet side 8, at least one discharge conduit, such as 11 or 12.

In expanded portion 9 is disposed a rotating body or rotor 13, having an appropriate diameter and having a width preferably substantially equal to the depth of the longitudinal recess 6. Rotor 13 is rigidly mounted on shaft 14 rotatably mounted in housing 1 and is connected to a rotating member, not shown, the angular velocity of which is to be measured.

Ahead of rotor 13 is mounted, on the bottom of the parallelepipedal recess 5, a fluid stream separator or bifurcator called the upstream separator 15, preferably having a substantially triangular shape, the apex 15' of the triangle thereof being directed upstream and the base of said triangle 15", 15''' preferably having the shape of a portion of rotor 13.

Downstream of the cylinder are mounted, on the bottom of the parallelepipedal recess 5, one or more fluid stream separators or bifurcators, called downstream separators, such as 16, and having preferably a triangular shape.

The base of the downstream separator 16 is placed between discharge conduits 11 and 12, the apex 16' being directed upstream of the fluid flow.

Figure 4:
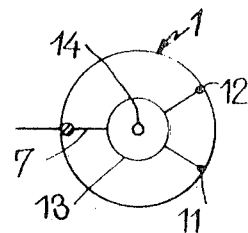
FIG. 4 is a schematic representation of the Flettner rotor of FIGS. 1 through 3.

In FIG. 4 is presented schematically a Flettner rotor forming a portion of the apparatus according to the invention. The first circle represents housing 1 and the second circle represents rotor 13 connected to shaft 14, the rotation of which is to be measured. Inlet 7 and outlet conduits 11 and 12 are represented by segments on the right resting radially on rotor 13.

Figure 5:
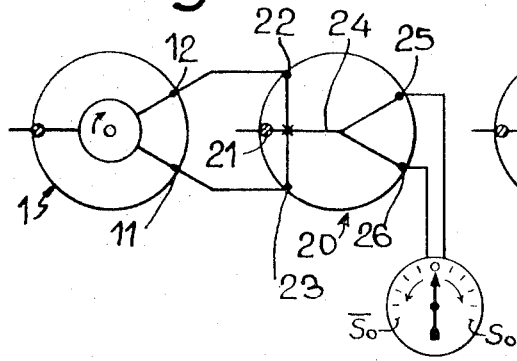
FIG. 5 is a schematic representation of a Flettner rotor in combination with pressure detecting and measuring apparatus.

In FIG. 5, there is shown one embodiment of the apparatus according to the invention including the Flettner rotor associated with a proportional amplifier 20 and a differential pressure gauge, the proportional amplifier being supplied with fluid through inlet conduit 21.

Outlet conduits 11 and 12 of the detector are connected respectively to control inlets 22 and 23 of the proportional amplifier, these conduits discharging into conduit 24 of driving or supply fluid coming from inlet 21. Conduit 24 is then divided into two conduits discharging into outlets 25 and 26 across which is disposed the differential pressure gauge.

Figure 6:
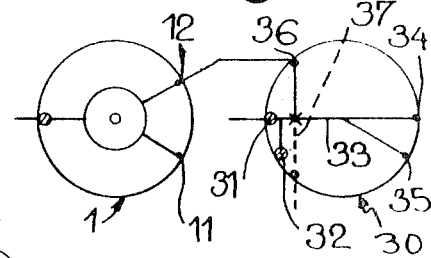
FIG. 6 is a schematic representation of a Flettner rotor in association with a pressure detecting and measuring device for indicating the presence of a fluid pressure above a predetermined threshold value.

In FIG. 6 the portion of the device comprising the Flettner rotor is associated with a Schmitt trigger-type device 30 comprising principal fluid inlet 31 and secondary fluid inlet 32 discharging into conduit 33 which is then divided into two conduits discharging into outlets 34 and 35. Outlet conduit 12 of the detector is connected to the control inlet 36.

In now describing the operation of the above-described apparatus, it will be observed that the flow of fluid, for example, air, coming from supply conduit 10 is disturbed by cylinder 13 connected to the shaft, the angular velocity of which is to be measured. The distribution of pressures downstream of the cylinder is directly associated with the rotation of the latter, this phenomenon being called the "Flettner effect."

The volume of fluid is distributed between outlet conduits 11 and 12 as a function of cylinder 13 rotation velocity.

Let $q_1$ and $q_2$ be volumes of fluid in outlet conduits 11 and 12 respectively.

According to FIG. 4, for a clockwise rotation, there exists the inequality $q_1 > q_2$, while for a stationary disc 13 there exists equality $q_1 = q_2$.

For determining the direction of the shaft rotation the Flettner rotor is connected with a proportional amplifier 20 according to FIG. 5.

In proportional amplifier 20 a stream of fluid passes through conduit 21 and distributes itself in a certain proportion between outlets 25 and 26. A secondary stream issuing from the control inlet 22 deflects the fluid stream towards outlet 25 which provides a signal, for example $S_0$. When a secondary stream issuing from control inlet 23 deflects the fluid stream towards outlet 26, it provides a complementary signal $S_0$.

Thus, as shown in FIG. 5, a clockwise rotation produces inequality $q_1 > q_2$ and therefore provides signal $\bar{S}_o$ at outlet 25. A rotation in the opposite direction would produce signal $S_o$.

In addition, the presence of the signal as discussed above provides an indication of the direction of the shaft rotation.

In order to determine the exceeding of the threshold of the angular velocity, the Flettner rotor is connected, as indicated by the scheme of FIG. 6, to a polarized Schmidt-type trigger 30. This polarized device 30 has but a single control inlet 26, to which is connected, for example, the outlet passage 12 of the detector, the outlet 11 being, for example, open. A secondary fluid inlet 32 acts on the stream in such a way as to provide signal $S_o$ in a normal way at one of the outlets 34 and 35. When the velocity of rotation is below that of the threshold velocity relative the reference signal introduced by conduit 37, the insufficient volume $q_1$ cannot adequately deflect the principal fluid stream to cause switching to produce the $S_o$ signal. Inversely, when the rotational speed of the shaft reaches the set limit, volume $q_1$ becomes sufficient for causing the deflection of the stream towards outlets 34 and 35 which effects switching and the provision of the $\bar{S}_o$ signal.

I claim:

1. Apparatus for providing differential fluid pressure proportional to the angular rotation of a shaft comprising:
    a. a housing having a substantially linear passage therethrough for conducting a fluid stream from one end of the housing to the other,
    b. a shaft disposed in said housing substantially perpendicular to said fluid stream and rotatable about its axis in either direction,
    c. a first fluid stream bifurcator in said passage disposed upstream of said shaft and dividing said fluid stream into a pair of stream branches in a plane perpendicular to said shaft,
    d. a rotor fixed on said shaft in said housing for free rotation in said housing,
    e. a second fluid stream bifurcator disposed in said passage downstream of said rotor in substantially the same plane as said first fluid stream bifurcator, and
    f. a pair of outlet passages in said housing disposed downstream of said second bifurcator in said plane, each disposed to receive a different one of said stream branches.

2. Apparatus as recited in claim 1, in which:
    a. the downstream end of said first fluid stream bifurcator is disposed immediately adjacent said rotor with clearance,
    b. said downstream end having a concave contour on a radius substantially the same as the radius of said rotor.

3. An angular velocity measuring and direction indicating apparatus, comprising:
    a. a housing having a cavity therein,
    b. a fluid pressure supply passage in said housing communicating with said cavity,
    c. a pair of delivery passages in said housing communicating with said cavity substantially opposite said fluid pressure supply passage at two spaced points in a plane including said fluid pressure supply passage,
    d. a shaft in said housing extending into said cavity substantially perpendicular to said plane and rotatable in either direction,
    e. a rotor in said cavity fixed on said shaft for free rotation in said cavity,
    f. said supply passage being disposed to direct a fluid stream into said cavity toward said rotor along a line coincident with a given diameter of said rotor,
    g. said rotor having a diameter smaller than that of said cavity and having a periphery dividing said fluid stream into two branch streams flowing through two flow paths formed on radially opposite sides of said rotor, said flow paths being boarded by the walls of said cavity and said periphery of said rotor,
    h. said two delivery passages disposed downstream of said rotor and equidistant from and on opposite sides of said line,
    i. means for indicating whichever of said two delivery passages is at the higher pressure and the pressure differential therebetween, and
    j. means disposed upstream of said rotor for dividing said fluid stream into a pair of branch streams and directing said branch streams to respective ones of said two flow paths.

4. An angular velocity measuring and direction indicating apparatus, as recited in claim 3, further including means disposed down stream of said rotor for directing said branch streams from said pair of flow paths to respective ones of said pair of delivery passages.